Figure 1:
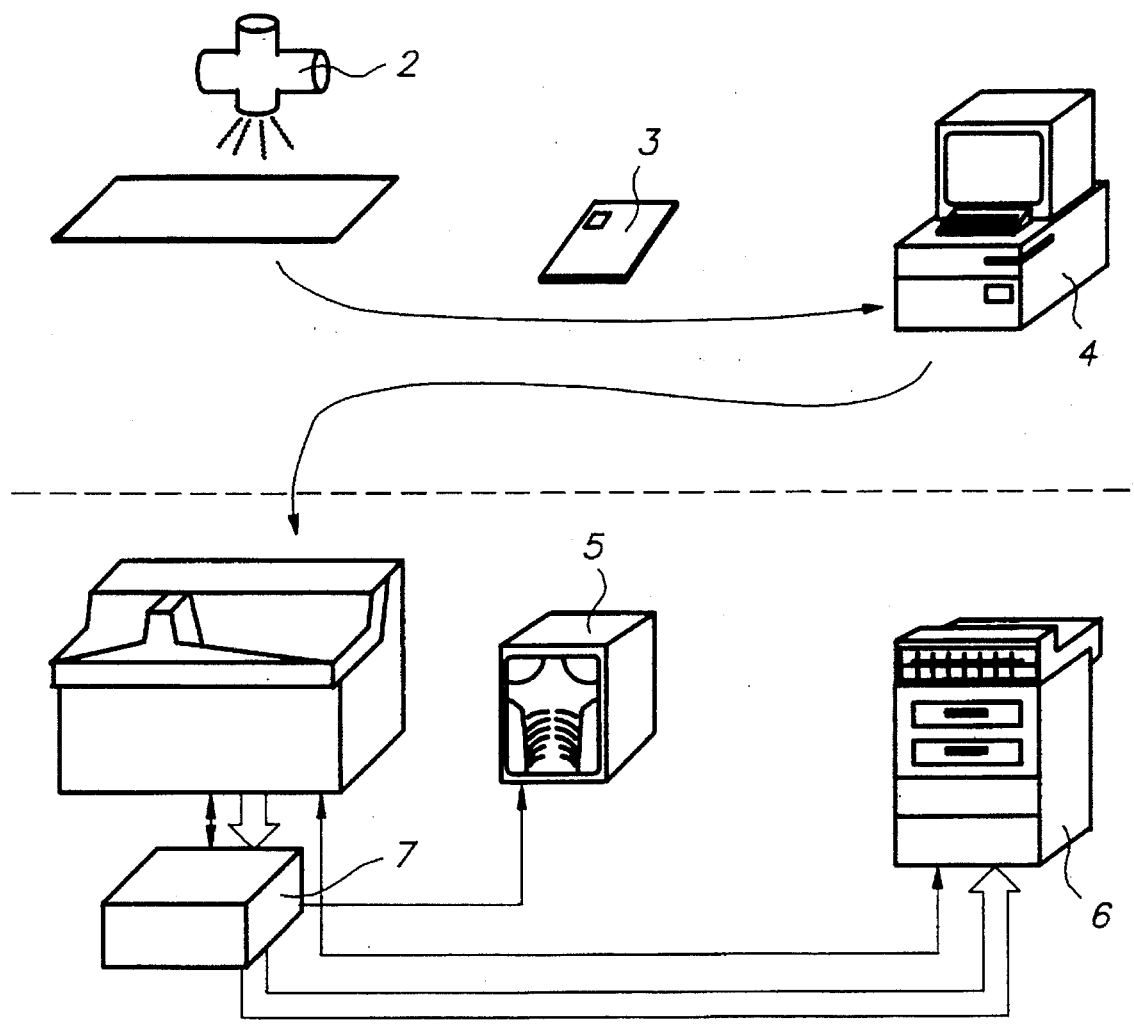

United States Patent [19]

Vuylsteke

[11] Patent Number: 5,536,946

[45] Date of Patent: Jul. 16, 1996

[54] METHOD AND APPARATUS FOR CONTROLLING THE EFFECTIVELY APPLIED IRRADIATION AMOUNT

[75] Inventor: Pieter Vuylsteke, Mortsel, Belgium

[73] Assignee: AGFA-Gevaert, Mortsel, Belgium

[21] Appl. No.: 286,478

[22] Filed: Aug. 5, 1994

[30] Foreign Application Priority Data

Aug. 16, 1993 [EP] European Pat. Off. ............ 93202390

[51] Int. Cl.⁶ .................................................. G01N 23/04
[52] U.S. Cl. ........................................ 250/586; 250/581
[58] Field of Search .................................... 250/587, 586, 250/581

[56] References Cited

FOREIGN PATENT DOCUMENTS 4324438  11/1992  Japan ..................................... 250/587

*Primary Examiner*—Carolyn E. Fields
*Attorney, Agent, or Firm*—Richard J. Birch

[57] ABSTRACT

A method and an apparatus are disclosed for controlling the amount of irradiation effectively emitted by a source of penetrating radiation in a system wherein radiation emitted by said source and attenuated by an object is stored in a photostimulable phosphor screen. An indication of the effectively emitted radiation amount is obtained by means of a difference of a specific signal value and a predetermined signal value.

18 Claims, 4 Drawing Sheets

METHOD AND APPARATUS FOR CONTROLLING THE EFFECTIVELY APPLIED IRRADIATION AMOUNT

FIELD OF THE INVENTION

The invention is in the field of digital radiography. The invention more specifically relates to a method of controlling the amount of radiation to which an object was exposed at the time of recording a radiation image of said object.

BACKGROUND OF THE INVENTION

It is well-known that in case a patient is irradiated by means of penetrating radiation such as x-rays it is most important that the radiation dose to which the patient is exposed is accurately controlled so as to avoid excess exposure which is harmful for the patient.

It is thus extremely important that fluctuations of the emission of a radiation source or deviations of the effectively emitted amount of irradiation from the set amount of irradiation are accurately monitored and adjusted when necessary.

In classical radiography wherein a radiation image is recorded onto a radiographic film, a relation has been established which defines for each specific combination of an intensifying screen and a film the optimal radiation dose to be applied in order to achieve that the diagnostically relevant part of an image is reproduced on the radiographic film at an optimal image density.

Different types of radiographic screen-film combinations have been developed that each provide this optimal reproduction at different irradiation doses. Each of these different types of screen-film combinations is particularly suitable for a specific examination or group of examinations.

The radiation dose suitable for application with a specific radiographic screen-film combination is defined by a value S which is a characteristic of a given radiographic combination called the "speed class". For each radiographic screen-film combination the optimal irradiation dose can be deduced from the speed class value by applying the formula given hereinbelow.

When setting the radiation dose at the deduced value, the diagnostically relevant part of an image will be recorded on a selected film at an optical density which is approximately 1.0 above fog and base density. This speed class value S is defined as follows:

$$S = \frac{10^{-3} Gy}{K_s}$$

wherein $K_s$ represents the exposure dose required to produce on said film an optical density of 1.00 above fog and base density, said value $K_s$ being expressed in Gy.

For example, when using a class 100 screen-film combination for recording a radiation image, the x-ray dose must be adjusted so that the average dose at the detector (so at the radiographic film) is about $10^{-5}$ Gy in the regions of diagnostical interest which corresponds to an exposure dose of 1.14 mR; when using a screen-film combination of speed class 200 the dose can be halved etc.

Thus, when in classical radiography the radiation dose is set to the value deduced from the definition of the speed class of a selected screen-film combination, the image on the film will always have an identical and predictable density pattern.

Hence an experienced radiologist is able to predict how the density pattern of an exposed part on a radiographic film of a given speed class will look like when the radiation dose is set correctly and hence he will also be able to remark anomalies in the outlook of a diagnostically relevant part that are due to incorrect setting of the radiation source judging from the density of the hard copy. In this way he is immediately and almost automatically warned when the effectively applied radiation dose differs from the required dose because of the direct relation that exists between the amount of radiation transmitted by an object, in case a patient, and the density appearing on the radiographic film.

In digital radiography no such direct relation exists as will be explained furtheron.

In digital radiography a technique has been developed wherein a radiation image of an object is obtained by using a screen comprising a photostimulable phosphor such as described in European patent application 503 702 published on Sep. 16, 1992 and in U.S. Ser. No. 07/842,603.

Upon exposure to penetrating radiation such as x-rays emitted by a radiation source, a photostimulable phosphor screen of the kind described in the above patent applications stores energy. The stored energy can be released by scanning the screen with stimulating radiation, e.g. laser light of the appropriate wavelength. The light emitted upon stimulation which is proportional to the original incident radiation absorption in the screen can then be detected and converted into an electric representation by a read-out system such as a photomultiplier. The gain of the read-out system is commonly adjusted to the expected amount of emitted light by changing the photomultiplier cathode voltage. The read out signal is then digitized.

Preferably the analog image signal is compressed by means of a square root amplifier before being fed to an analog to digital convertor. Compression according to a square root characteristic is advantageous in that it provides optimal use of the dynamic range of the A/D convertor. The result of a compression according to square root characteristic has a constant noise level-throughout the compressed signal range. Since the quantisation error is also constant, the ratio of quantisation noise to signal noise is also constant resulting in an optimal distribution of the bits throughout the dynamic range of the A/D convertor.

After A/D conversion one disposes of an N-bit 'raw' image signal, that can be subjected to image processing before hard copy recording or display so that for each type of examination the diagnostically relevant information can be reproduced in optimal conditions.

Among the image processing algorithms a so-called autowindowing algorithm can be applied to determine the diagnostically relevant signal range out of the entire read out signal range.

The latitude and position of this relevant range can be determined automatically using significant points (minima, maxima . . . ) of-the image histogram. A method of determining such significant points has been described in our European application EP 546 600 filed on Dec. 9, 1991 and in U.S. Ser. No. 07/978,786.

The data within the selected window are then mapped onto the density range available on a recording material or on a display. One embodiment of such a signal-to-density mapping method is described in our European application EP 549 009 filed on Dec. 9, 1991 and in U.S. Ser. No. 07/978,091.

The conversion of signal values into corresponding density values is no longer limited by the properties of the recording material, a virtually unlimited number of signalto-density transformations (or "sensitometries") adapted to each specific application can be selected:

With optimal window-level settings and selection of optimal reproduction sensitometry, it is in most circumstances possible to obtain high quality reproductions. The density pattern obtained on the hard copy is no longer directly related to the given radiation dose and hence the correspondence of the effectively applied radiation dose with the set irradiation dose can no longer be deduced by the radiologist from the density appearing on the hard copy.

A specific embodiment of a procedure followed by an operator when exposing a photostimulable phosphor screen and the implications of this procedure on the detected signal range will be described hereinbelow.

The procedure is based on the operator's knowledge of a classical radiographic system in which a radiation image is recorded on a radiographic film of a speed class suitable for a specific type of examination and wherein the applied radiation dose is deduced from the value of the speed class by application of the above formula.

Exposure of a photostimulable phosphor screen instead of a film of a specific speed class is performed by applying the same radiation dose as would be appropriate for a film of said specific speed class.

Following exposure the image stored in the exposed photostimulable phosphor screen is read by scanning said screen with stimulating radiation (such as laser light of the appropriate wavelength) and by detecting the light emitted upon stimulation by means of a detector such as a photomultiplier. The sensitivity of the detector is adjusted so that the expected read out signal range is centred relative to the detectable signal range (dynamic range of the read out system).

For example in a practical embodiment the detector is a photomultiplier with an adjustable photomultiplier voltage. The sensitivity of the photomultiplier can be changed stepwise, each of the steps for example differing by a factor two. Each setting of the photomultiplier is called a 'sensitivity class' in analogy with the notion of 'speed classes' used in connection with conventional radiographic film.

The photomultiplier voltage is set to such a value that the expected signal range has approximately equal margins with respect to the minimum and maximum value of the signal range of the read out system.

The data acquisition is commonly done on 12 bit over a range of 2.7 decades on the log E (E being exposure) scale. Depending upon the application the actual object latitude is limited to 1.5 decades on the log E scale or even less. Consequentially a safe margin is available for under- or overexposure.

The image processing algorithms provide that even in case of mal exposure to a limited extent still an acceptable reproduction is obtained, as will be explained hereinbelow.

So, thanks to the image processing even in case of under or overexposure within a limited range still an acceptable reproduction is obtained, but consequentially the result in the reproduction is not directly related to the applied exposure dose and the radiologist or operator can no longer judge from the outlook of the reproduction whether the dose to which the patient was exposed was appropriate for the given application. Since the operator is not warned he may even be stimulated to continue applying said dose.

Indeed, suppose a class 200 exposure was intended and actually 4 times an overexposure (corresponding with a class 50 setting) or 4 times an under exposure (corresponding with a class 800 setting) is performed, this would in either of the cases result in a 0.6 shift on the log E scale. Thus, in either of the cases, the data would still fall within the 2.7 on the log E scale. The autowindowing algorithm, being designed to operate on said 2.7 decades on the log E scale, would still select the relevant data range. Then, this range would be converted into density values so as to obtain a good reproduction or display.

OBJECTS OF THE INVENTION

It is an object of the invention to provide a method of controlling the radiation dose applied to an object in a digital radiographic system wherein a radiation image is stored in a photostimulable phosphor screen and wherein the image is read out by scanning said screen with stimulating rays.

It is a further object of this invention to provide an apparatus for carrying out the above method.

Still further objects will become apparent from the description hereinbelow.

STATEMENT OF THE INVENTION

According to the present invention the above objectives are met by a method of controlling the amount of irradiation effectively emitted by a source of penetrating radiation in a system wherein radiation emitted by said source and attenuated by an object is stored in a photostimulable phosphor screen, and wherein said screen is scanned by stimulating rays, the light emitted upon stimulation is detected and converted into an electric representation by a read out means, characterized by the steps of determining for a set irradiation amount a corresponding adjustment value for said read out means from a table which comprises for a number of predefined amounts of irradiation corresponding adjustment values for said read out means so that the mean signal value read out of a screen that has been exposed to an amount of irradiation by means of said read out means being adjusted by the corresponding value is equal to an expected value $Y_e$, adjusting the sensitivity of said read out means with said determined adjustment value, reading an image from said screen, determining a signal value $Y_a$ which is representative of the diagnostically relevant image portions, determining the difference $y_a - y_e$ representing the deviation of the effective irradiation dose from an expected irradiation dose, outputting at least one of said difference $y_a - y_e$, $y_a$ or $y_e$.

In a modified embodiment of the present invention at least one thresholding operation is performed on said difference value $y_a - y_e$ and warning signs are generated when said difference value is larger than some threshold value $T_o$ indicating overexposure, and when said difference is smaller than some threshold value $T_u$, indicating underexposure.

The difference $y_a - y_e$ gives an indication on the deviation of the actual amount of irradiation from the expected amount of irradiation and provides the operator with feedback so that he can initiate any measures necessary.

The position of the value $y_e$ is preferably such that by setting the detector to the value read out from said table at a given exposure value, the diagnostically relevant signal range is optimally positioned within the dynamic range of the read out system, i.e. that safe margins exist in either side of the diagnostically relevant part of the image histogram on the signal axis.

Such a position of the value $y_e$ is for example obtained when the difference $y_{max}-y_1$ is equal to the difference $y_0-y_{min}$. In this formula $y_{min}$ and $y_{max}$ are minimum and maximum signal values that can be read out and $y_0$ and $y_1$ are the extreme signal values of the diagnostically relevant region (log exposure values).

The diagnostically relevant region is defined as a range of signal values between two extreme values that can be calculated by applying the method disclosed in our European patent application 549 009 filed on Dec. 9, 1991 and in the corresponding U.S. Ser. No. 07/978,786.

The method comprises the following steps:

calculating a histogram of said image, determining the maximum value of histogram frequencies of the image histogram, selecting a value t smaller than the maximum histogram frequency, determining (a) histogram peak(s) as a range of successive signal values having a corresponding histogram frequency that is larger than t, determining the most relevant histogram peak as the histogram peak for which the summation of all histogram frequencies corresponding with signal values within said peak is maximum, determining minimum and maximum signal values within said most relevant histogrampeak, determining extreme values of the signal range to be extracted as said minimum value decreased with a small offset $d_0$ and said maximum value increased by a small offset value $d_1$.

Whether the effectively emitted amount of irradiation does not completely match the expected amount of irradiation is determined on the basis of a value $y_a$ which is representative of signal values within a diagnostically relevant region of the image.

This value $y_a$ is preferably determined as the mean value of all signal values within the diagnostically relevant signal range (within the range determined by the values $y_0$ and $y_1$ calculated as described in the above mentioned European patent application 546 600 and in the corresponding U.S. Ser. No. 07/978,786).

Alternatively the value $y_a$ is calculated as the median value of said range. The median value is preferable because this value is less sensitive to signal anomalies that originate from some kind of noise that the mean signal value.

Still alternatively $y_a$ is the value with the highest frequency of the histogram frequencies situated between the extreme values of the diagnostically relevant signal range determined for example as in the above mentioned European patent application 546 600 and the corresponding U.S. Ser. No. 07/978,786.

In a specific embodiment the read out means is a photomultiplier, the sensitivity of the photomultiplier is then adjusted by adjusting the photomultiplier cathode voltage.

A table is then created which relates a set of irradiation amounts with corresponding values for the photomultiplier voltage. An irradiation amount which may be expressed by the speed class at which in classical radiography this irradiation amount would be applied (the term speed class as defined in the introductory part of this application). The irradiation values are such that if a photostimulable phosphor screen is irradiated with an amount of irradiation that corresponds with a given speed class and the photomultiplier voltage is adjusted to the corresponding voltage value read out from the table that then the mean read out signal value is equal to a predetermined expected value $y_e$ irrespective of the set speed class.

In accordance with the method of the present invention an output is produced of at least one of said difference, $y_a$ or $y_e$.

This output can be performed by displaying said value(s) on a monitor such as a preview monitor or by printing the value(s) e.g. on film.

Alternatively the image histogram can be displayed or printed and the position of the value $y_a$ and/or $y_e$ can be indicated on the graphical representation of the histogram. Also the difference $y_a-y_e$ can be printed additionally.

Still alternatively at least one of the values $y_a-y_e$, $y_a$ or $y_e$ is written into an electronic file (referred to as a log file) and can be retrieved and read when required.

Still alternatively the difference $y_a-y_e$ can be thresholded and a warning can be generated in dependence on the result of said thresholding as has been described hereinbefore.

The present invention additionally comprises an apparatus for carrying out the above-described method. The apparatus generally comprises means for scanning a screen with stimulating irradiation, a detector for detecting light emitted upon stimulation and for converting said light into an electric signal representation, means for storing a table which comprises for a number of irradiation amounts a corresponding adjustment value for said detector said adjustment value being such that the mean signal value read out of a screen that has been exposed to an amount of irradiation by means of said detector being adjusted with the corresponding adjustment value, is equal to a predetermined value $y_e$.

means for retrieving from said table for a given irradiation amount the corresponding adjustment values, means for adjusting the sensitivity of said detector by means of the retrieved adjustment value, means for determining a signal value $y_a$ which is representative of signal values within a diagnostically relevant region of said image, means for calculating a difference $y_a-y_e$, means for outputting at least one of said difference $y_a-y_e$, $y_a$ or $y_e$.

In alternative embodiment the apparatus according to the present invention comprises means for thresholding said difference $y_a-y_e$ and for generating a first warning signal when said difference exceeds a first threshold value $T_o$ and for generating a second warning signal when said difference is smaller than a second threshold value $T_u$.

In a specific embodiment the detector is a photomultiplier and means are provided for adjusting the sensitivity of the detector by adjusting the cathode voltage of said photomultiplier.

The value $y_a$ is preferably determined by means for calculating the mean value or the median value of signal values within a signal range relevant for diagnosis. Alternatively said means for determining the value $y_a$ comprise means for calculating the histogram of read out signal values and for determining the value with the maximum histogram frequency.

A definition of the range relevant for diagnosis has been given hereinbefore. This range can be determined as described in European patent application 546 600(U.S. Ser. No. 07/978,786)

The apparatus is provided with means for outputting said difference $y_a-y_e$ or the value $y_a$ or the value $y_e$.

Preferably this function is performed by means for displaying or by means for recording on a recording material a histogram of a read out image signal provided with an indication of the position of said values $y_e$ and $y_a$ or with an indication of said difference.

Evidently the values mentioned above can be printed in absence of a print of the image histogram.

In addition or alternatively means can be provided for writing at least one of said values into an electronic file so that the value(s) can be retrieved and read whenever required.

In a specific embodiment a photostimulable phosphor screen is conveyed in a cassette provided with an identification means. One example of such an identification means is an electrically erasable programmable read only memory (EEPROM) into which patient information such as the patient's name etc., information relating to the examination type etc. can be written in an identification station.

The EEPROM can also be used to store information that is intended to be used for adjusting parameters relating to the operation of the image read out device.

The EEPROM can store an indication on the irradiation amount that was used when exposing a patient, for example the EEPROM can store the speed class.

When a cassette conveying an exposed photostimulable phosphor screen is then fed into a read out device, the information is read out from the EEPROM, information concerning adjustments of the image readout device can be translated into appropriate adjustment commands for the components of the read out device. In particular, the speed class indication can be read out from the EEPROM and can be linked with a corresponding adjustment value for the photomultiplier voltage via a preloaded look up table such as described hereinbefore.

Figure 2:
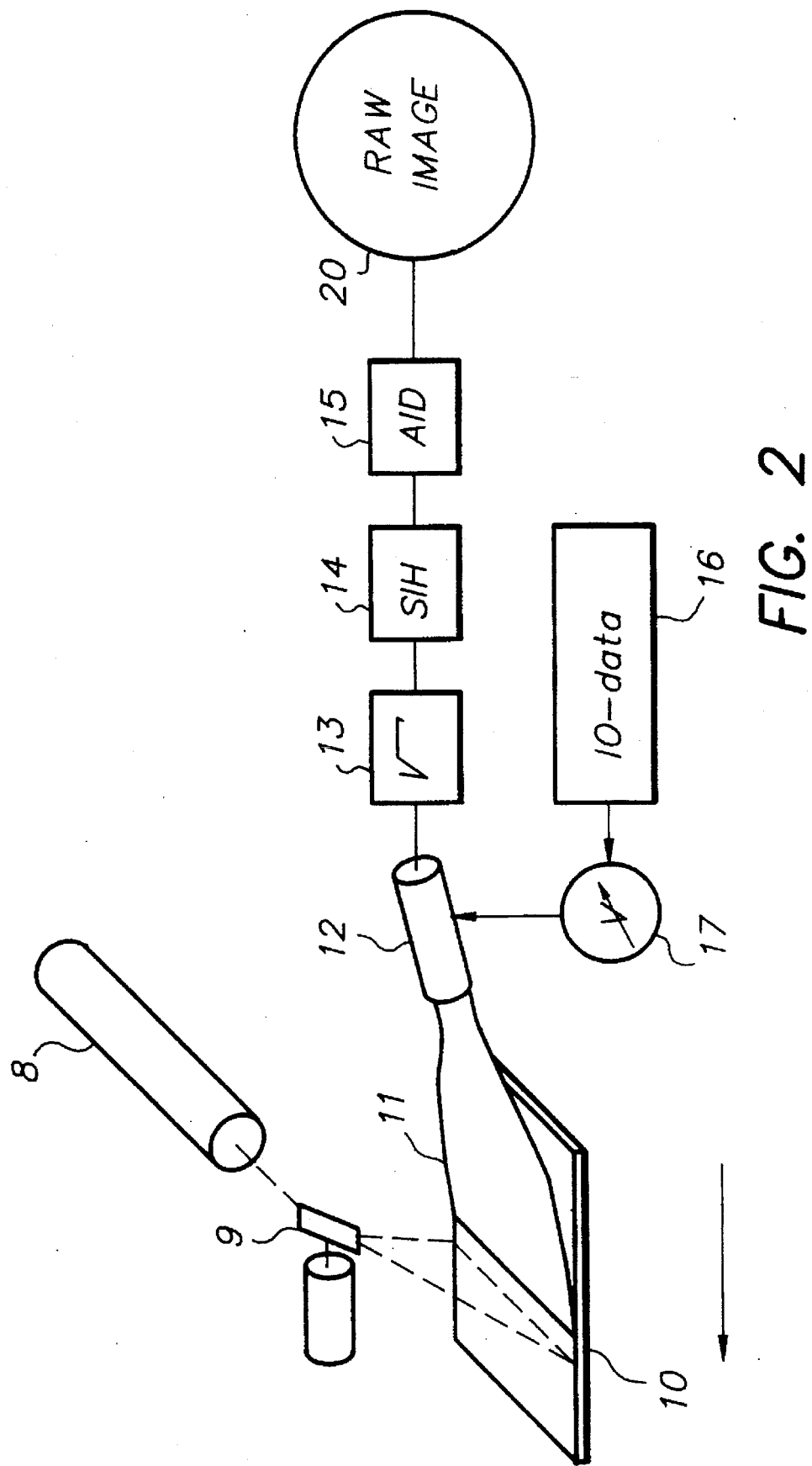
Figure 3:
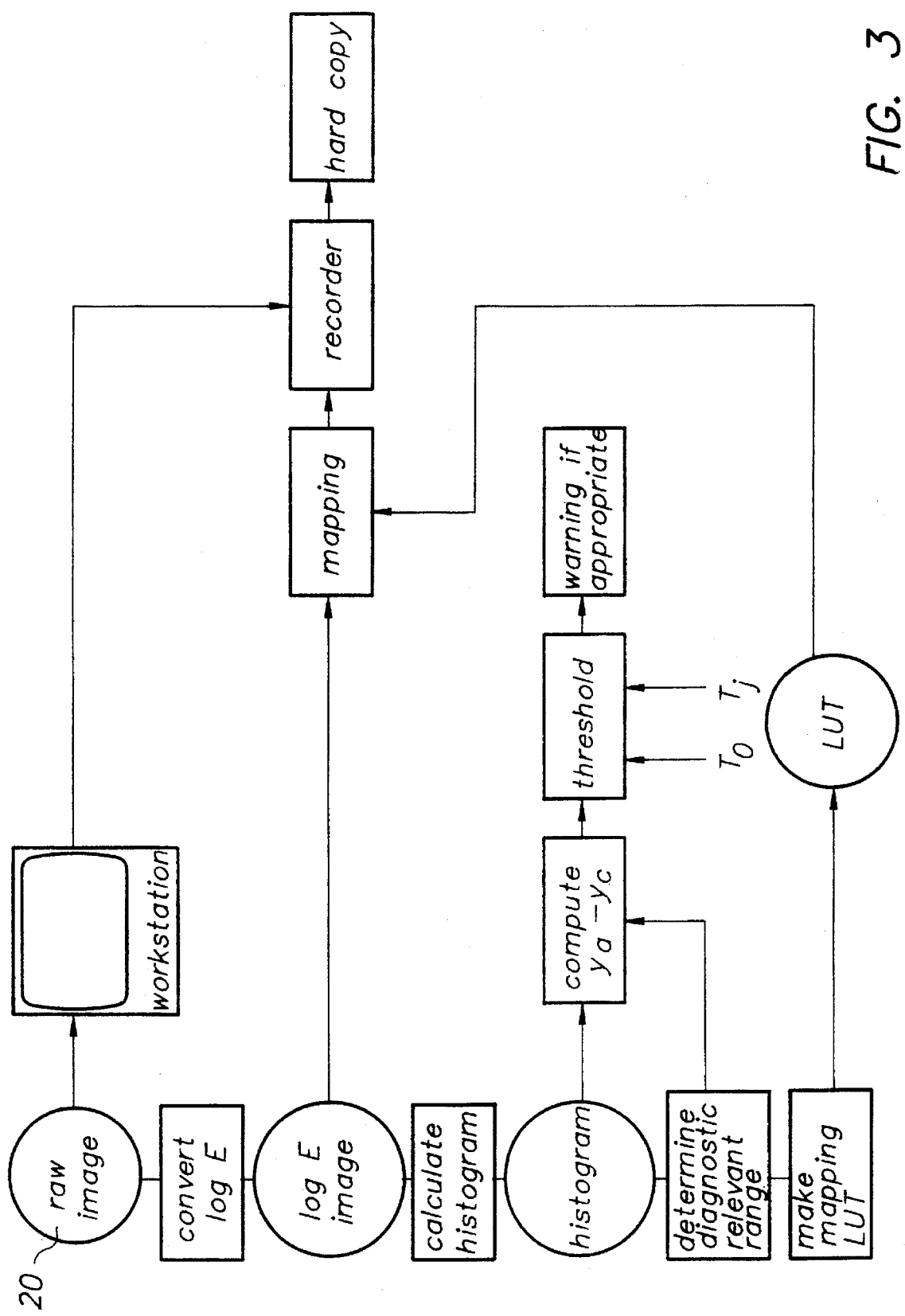
Figures 4, 5:
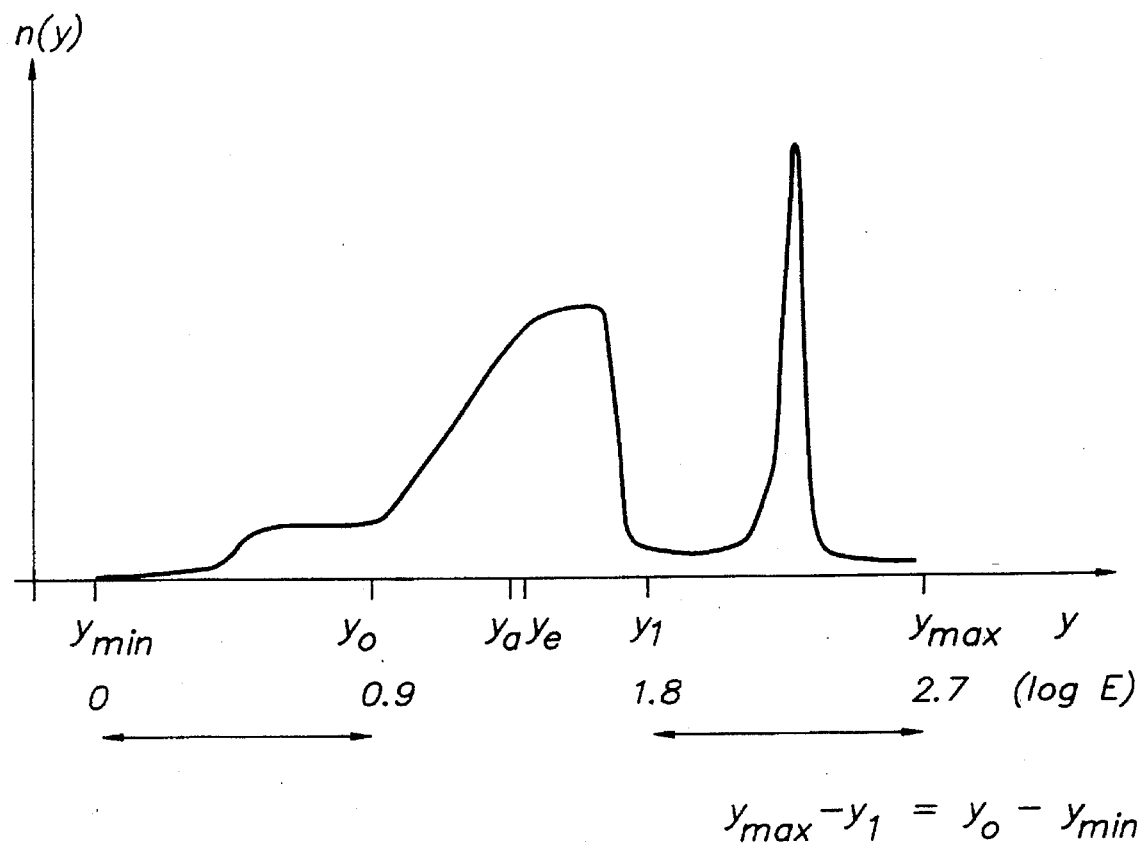

Further details concerning the method and apparatus according to the present invention are described hereinbelow with reference to the drawings wherein FIG. 1 generally shows a system in which the method of the invention can be applied, FIG. 2 is a specific embodiment of an apparatus for reading out an image stored in a photostimulable phosphor screen, FIG. 3 is a block scheme illustrating the data flow, FIG. 4 is a histogram that is typical for a radiographic image, FIG. 5 is a table relating a set of irradiation amounts emitted by a source of irradiation with corresponding voltage settings for a photomultiplier.

FIG. 1 generally shows an apparatus in which the method of the invention can be applied.

A radiation image of an object was recorded on a photostimulable phosphor screen (3) by exposing (2) said screen to x-rays emitted by a source of irradiation and transmitted through the object (not shown).

The adjustment of the source of irradiation was performed by calculating for a specific speed class the appropriate amount of irradiation and by adjusting the source so as to (at least theoretically) produce said amount.

The stimulable phosphor screen was conveyed in a cassette (3) provided with an electrically erasable programmable read only memory (EEPROM). In an identification station 4 various kinds of data, for example patient identification data (name, date of birth) and data relating to the exposure such as the sensitivity class setting and data relating to the examination type or to the expected diagnosis were written into the EEPROM.

The operation of radiation image read-out apparatus 1 is illustrated in FIG. 2.

First the data stored in the EEPROM were read out (not shown). The value representing the selected speed class was used to preset the sensitivity of the photomultiplier by adjusting its voltage (17) to a value retrieved from a table (16) that comprises for a number of irradiation amounts of said source of irradiation (represented by 'sensitivity class' values) corresponding adjustment values for the photomultiplier voltage.

These adjustment values were determined in advance following the procedure described furtheron and stored in the form of a look up table in a memory part of the read out apparatus (1). The cathode voltage values for the photomultiplier are such that the mean signal value read out of a screen that has been exposed to an amount of irradiation by means of said read out means being adjusted by the corresponding value is equal to an expected value $y_e$.

The adjustment values stored in a look up table were determined by an iterative process wherein first an exposure is made according to a specific sensitivity class, then the signal is detected by means of a photomultiplier the cathode voltage of which is set to an initial value. Next, the photomultiplier cathode voltage is adjusted if the detected signal is too low or too high and the procedure of exposing, detecting and adapting the photomultiplier voltage until $y_a$ equals $y_e$.

The above steps are repeated for every entry (exposure class) in the table.

An example of such a look up table is illustrated in FIG. 5. The sensitivity class setting was further used together with the data regarding the particular application to control the selection of the parameters for the image processing.

Next, the radiation image stored in the photostimulable phosphor screen was read-out by scanning the phosphor screen with stimulating rays emitted by a laser 8. The stimulating rays were deflected according to the main scanning direction by means of galvanometric deflection device 9. The secondary scanning motion was performed by transporting the phosphor screen in a direction indicated by arrow 10 perpendicular to the main scanning direction. The stimulated emission was directed by means of light collector 11 onto a photomultiplier 12. A cylindrical mirror (not schown) was provided for directing the light emitted upon stimulation into the entrance face of the light collector 11. The light directed onto photomultiplier 12 was converted into an electic signal representation. This signal was thereupon amplified in an amplifier 13 having a square root characteristic and sampled by a sample and hold circuit 14. Then it was converted into a 12 bit digital signal by means of an analog to digital converter 15.

After read-out the photostimulable phosphor screen was conveyed through an erasure section (part of read out apparatus (1)) for erasing any residual image remaining on the pihotostimulable phosphor screen. The erasing section comprises a number of aligned quartz tungsten halogen lamps with a continuous spectral irradiance output distribution extending approximately from 200 micrometer to 2.5 micrometer.

The subsequent data flow is illustrated in FIG. 3.

The digital image signal, called the 'raw' image or 'original' image 20 was sent to the image processing module of the read-out apparatus. (FIG. 1, numeral 7) where it was stored in an internal buffer.

Without any modifications it was also sent from the image processor to the image workstation 5 where it was temporarily stored on a hard disc. This back up ensured that the signal was never lost, even not when any of the components of the apparatus would fail and that the signal could be retrieved for any kind of later processing, for example processing with different parameter setting. This feature could be used when the result of the on-line processing was unsatisfactory due to bad exposure conditions or inadequate selection of the processing parameters.

Next the digital image signal was converted into an image representing logarithm values of exposure values using a logarithmic conversion look up table.

The latitude of the raw image is normally too large to be printed on film or to be displayed on a monitor. Therefore the latitude was confined to the diagnostically relevant region.

In order to determine the diagnostically relevant region the image histogram was first calculated and then a relevant signal range was selected according to the method described in our European application 546 600 filed on Dec. 9, 1991; which method is based on an evaluation of the image histogram as discussed above.

FIG. 4 shows a typical histogram of a radiographic image. On this figure the diagnostically relevant range is indicated as the range in between two extreme values $y_0$ and $y_1$. (In the above patent application these values were referred to as $S_0$ and $S_1$). The margins of the range that can be read out given the specifications of the read out system are indicated by the values $y_{min}$ and $y_{max}$.

In accordance with the present invention the effectively applied radiation dose is controlled by calculating a specific value $y_a$ which is equal to the mean value of signal values within the diagnostically relevant range delimited by the values $y_0$ and $y_1$.

Next the difference $y_a-y_e$ is calculated. This value gives an indication of the deviation of the actually applied radiation dose relative to the radiation dose that was intended to be applied.

This value $y_a-y_e$ is then compared with two threshold values and in accordance with the result of this thresholding warning signals for the operator were generated in case the difference was smaller than some threshold $t_u$ or when the difference was larger than some threshold $t_0$.

In either of these cases a visible signal was produced on the display part of the user interface of the read out apparatus.

Reference is again made to FIG. 3 for illustration of the description of the further sequence of the data flow.

Independently of the procedure for controlling the actual radiation dose, the digital data in the selected window were converted into grey values according to an appropriate sensitometric mapping curve that was determined as described in our European application 549 009 filed on Dec. 9, 1991.

In accordance with the method described in this application a gradation curve was created by the steps of defining a canonical monotonical non-constant function $Y(x)$ in an orthogonal coordinate system $(x,y)$ between arbitrary values $x_0$ and $x_1$ and $y_{min}$ and $y_{max}$, determining minimum and maximum density values $D_{smin}$ and $D_{smax}$, determining minimum and maximum signal values $S_{min}$ and $S_{max}$ constituting a range wherein the gradation is defined by the canonical form and outside of which signal values are mapped onto $D_{smin}$ or $D_{smax}$, defining the gradation curve as $$D(s)=D_{smin}+(Y(x(s))-y_{min})\cdot(D_{smax}-D_{smin})/(y_{max}-y_{min})$$

wherein $D(s)$ is the density in the reproduction as a function of the signal value $s$, $x(s)=x_0$ if $s$ is smaller than or equal to $S_{min}$, $x(s)=x_0+(s-S_{min})\cdot(x_1-x_0)/(S_{max}-S_{min})$ if $s$ is comprised between $S_{min}$ and $S_{max}$, and $x(s)=x_1$ if $s$ is larger than or equal to $S_{max}$.

In this embodiment $S_{max}$ was equal to $S_{min}+L$ wherein L is a constant latitude value envisioned in a reproduction of said image and $S_{min}$ is determined by aligning a signal value at a predetermined relative position between $S_{min}$ and $S_{max}$ with a signal value at the same predetermined relative position between $y_0-dy_0$ and $y_1+dy_1$ wherein $y_1-y_0$ is the diagnostically relevant signal range and wherein $dy_0$ and $dy_1$ are offset values comprised in the range confined by $-L/2$ and $L/2$.

Alternatives are described in the above identified application.

Next, the data were transferred to an output recorder to be printed on film. It was also possible to display the image on a display unit.

One example of a suitable recorder is a multi-format laser recorder but other types of recorder units such as thermal printers are also suitable output devices.

The layout of the hard copy can be varied according to the specific requirements of the radiologist.

It is common practice to provide on one hard copy a juxtaposition of at least two images originating from the same original image, e.g. a first reproduction of the unprocessed image and a second reproduction corresponding with data that have been subjected to an image enhancement algorithm.

It is further possible to produce automatically for each image that is applied to the recorder a minified reproduction in addition to the normal size reproduction. An easy minification is for example by a factor of two such that every common 14"×17" original size image will be reproduced in a 17.5×21.5 size on a standard size film format (e.g. of 18×24 cm or 8"×10").

This minified reproduction can serve various purposes. One of the most important being the improvement of the radiologist's performance when examining a radiograph by providing a similar effect as the effect obtained when examining a radiograph or part thereof through a diminishing lens, a procedure which is sometimes performed by the radiologist for the purpose of increasing the probability of perceiving an unsharp, low contrast shadow part.

Eventually the reduced size reproduction can be produced on a "reporting" film with somewhat limited quality f.i. a reduced $D_{max}$ which could save some of the cost.

Additionally the reduced image can serve other purposes, which might increase the overall quality and/or productivity of the radiology department.

For instance, it can be used for archiving purposes to improve the communication with the referring physician. The unused film area can then be used as a text field adapted to each kind of examination which allows the radiologist to generate rapidly a high quality report by filling out some fields or by marking some preprinted items. Drawings to clarify the radiologist's statements are no longer required because the film can directly be annotated. The reporting option can run automatically or it can be coupled to the menu's selected in the identification station. The text field can be adapted to the examination and/or to the hospital or radiologist.

In accordance with the present invention a display of the image histogram (log E values versus number of pixels) was added to the text field of a full size format reproduction of the image.

An example of a graphical representation of an image histogram is shown in FIG. 4. On this graphical representation of the image histogram the position of the value $y_a$ as well as the position of the value $y_e$ was indicated. Additionally markers were added for indicating the margins of the data range $[y_0,y_1]$ selected as relevant signal range for diagnosis. It was also possible to add to this reproduction the sensitometric mapping curve representing the conversion of read-out signal values to density values.

This display of the histogram and accompanying features is a convenient tool for the radiologist to get a first impression of the position of the histogram on the log E axis and to make a first conclusion as to whether the actual exposure dose is drifting or misadjusted by evaluating the relative position of $y_a$ and $y_e$. If necessary this evaluation is to be followed by an appropriate adjustment of the setting of the irradiation source.

The above description does not describe any particular image processing other than the processing for determining the diagnostically relevant signal range and the signal-to-density mapping that is performed on the image.

It will be clear to the man skilled in the art that the image can be subjected to a wide variety of image processing algorithms for contrast enhancement, noise reduction and several other purposes before being applied to the recorder or to the display device for reproduction or display.

The type of image processing as well as the parameters to be used when processing the image can be defined by means of information that was written into the EEPROM provided on the screen conveying cassette.

Processing parameters can for example be retrieved from a prestored look up table in correspondence with a specific type of examination that has been entered into the EEPROM during identification.

Alternatively the type of processing as well as the parameters to be used can be selected (and for example retrieved from a look up table) in dependence on the expected diagnosis.

Still other alternatives may be envisioned.

Examples of image processing methods can be found for example in the following European applications: EP 527 525 filed Aug. 14, 1991(U.S. Pat. No. 5,467,404); EP 574 969 filed Jun. 19, 1992 and (U.S. Pat. No. 5,461,658) in 93200375.9 filed Feb. 11, 1993(U.S. Ser. No. 08/412,355).

I claim:

1. A method of monitoring the amount of radiation actually emitted by a source of penetrating radiation in a system wherein radiation emitted by said source and attenuated by an object is stored in a photostimulable phosphor screen, and wherein said screen is scanned by stimulating rays, the light emitted upon stimulation is detected and converted into an electric representation by a read out means, characterized by the steps of determining for a set irradiation amount a corresponding adjustment value for said read out means from a table which comprises for a number of predefined amounts of irradiation a corresponding adjustment value for said read out means, the adjustment values being such that the mean signal value read out of a screen that has been exposed to said amount of irradiation by means of the read out means being adjusted by the corresponding value is equal to an expected value $y_e$, adjusting said read out means with the determined adjustment value, reading an image from said screen, determining a signal value $y_a$ which is representative of a diagnostically relevant part of said image, determining the difference $y_a-y_e$ representing the deviation of the actual irradiation dose from an expected irradiation dose, outputting said difference.

2. A method according to claim 1 wherein the light emitted upon stimulation is detected means of a photomultiplier and said table comprises photomultiplier voltages corresponding with a set of irradiation amounts.

3. A method according to claim 1 wherein $y_e$ is such that if a correct dose is applied which implies that $y_a=y_e$, then the difference $y_{max}-y_1$ is equal to the difference $y_0-y_{min}$ with $y_{min}$ and $y_{max}$ are the minimum and maximum values that can be read out and $y_0$ and $y_1$ are the extreme values of a signal range relevant for diagnosis.

4. A method according to claim 3 wherein said values $y_0$ and $y_1$ are determined by the steps of calculating an histogram of said image, determining maximum value of histogram frequencies, selecting a value t smaller than the maximum histogram frequency, determining (a) histogram peak(s) as a range of successive signal values having a corresponding histogram frequency that is larger than t, determining the most relevant histogram peak as the histogram peak for which the summation of all histogram frequencies corresponding with signal values within said peak is maximum, determining minimum and maximum signal values within said most relevant histogram peak, determining extreme values of the signal range to be extracted as said minimum value decreased with a offset $d_0$ and said maximum value increased by a offset value $d_1$.

5. A method according to claim 1 wherein $y_a$ is determined as the mean value of signal values within the signal range inbetween $y_0$ and $y_1$.

6. A method according to claim 1 wherein $y_a$ is determined as the median value of signal values within the signal range inbetween $y_0$ and $y_1$.

7. A method according to claim 1 wherein $y_a$ is determined as the value with the highest histogram frequency in the signal range inbetween $y_0$ and $y_1$.

8. A method according to claim 1 wherein said difference $y_a-y_e$ is subjected to at least one thresholding operation and wherein at least one warning signal is generated in dependence on the result of said thresholding operation(s).

9. An apparatus for reading a radiation image that has been stored in a photostimulable phosphor screen comprising means for scanning said screen with stimulating radiation, a detector for detecting light emitted upon stimulation and for converting said light into an electric signal representation, means for storing a table which comprises for a number of irradiation amounts a corresponding adjustment value for said detector, said adjustment value being such that the mean signal value read out with a detector adjusted to the stored value from a screen that has been exposed to a corresponding amount of irradiation is equal to a predetermined value $y_e$, means for retrieving from said table for a given irradiation amount the corresponding adjustment values, means for adjusting the sensitivity of said detector by means of the retrieved adjustment value, means for determining a signal value $y_a$ which is representative of signal values within a diagnostically relevant region of said image, means for calculating a difference $y_a-y_e$, means for outputting at least one of said difference $y_a-y_e$ or the value $y_a$ or the value $y_e$.

10. An apparatus according to claim 9 wherein said detector is a photomultiplier and wherein said means for adjusting the sensitivity of said detector comprise means for adjusting the cathode voltage of said photomultiplier.

11. An apparatus according to claim 9 wherein said means for determining the value $y_a$ comprise means for calculating the mean value of signal value within a signal range relevant for diagnosis.

12. An apparatus according to claim 9 wherein said means for determining the value $y_a$ comprise means for calculating the median value of signal value within a signal range relevant for diagnosis.

13. An apparatus according to claim 9 wherein said means for determining the value $y_a$ comprise means for calculating the histogram of read out signal values and for determining the maximum of the histogram values.

14. An apparatus according to claim 9 wherein said means for outputting said difference comprise means for recording a histogram of a read out image signal on a recording material and for providing the image of said histogram with an indication of the position of at least one of said values $y_e$ or $y_a$.

15. An apparatus according to claim 9 wherein said means for outputting either one of said difference, $y_a$ or $y_e$ comprise means for writing at least one of said values in an electronic file.

16. An apparatus according to claim 9 wherein said screen is conveyed in a cassette provided with identification means storing at least an indication of an amount of irradiation.

17. An apparatus according to claim 16 wherein said identification means is an electrically erasable programmable read only memory device (EEPROM).

18. An apparatus according to claim 9 wherein means are provided for thresholding said difference and for generating a warning signal in dependence on the result of said thresholding.

* * * * *